P. H. BEAVER.

Collar-Pads.

No. 137,049.

Patented March 25, 1873.

UNITED STATES PATENT OFFICE.

PETER H. BEAVER, OF MONTANDON, PENNSYLVANIA.

IMPROVEMENT IN COLLAR-PADS.

Specification forming part of Letters Patent No. 137,049, dated March 25, 1873.

*To all whom it may concern:*

Figure 1:
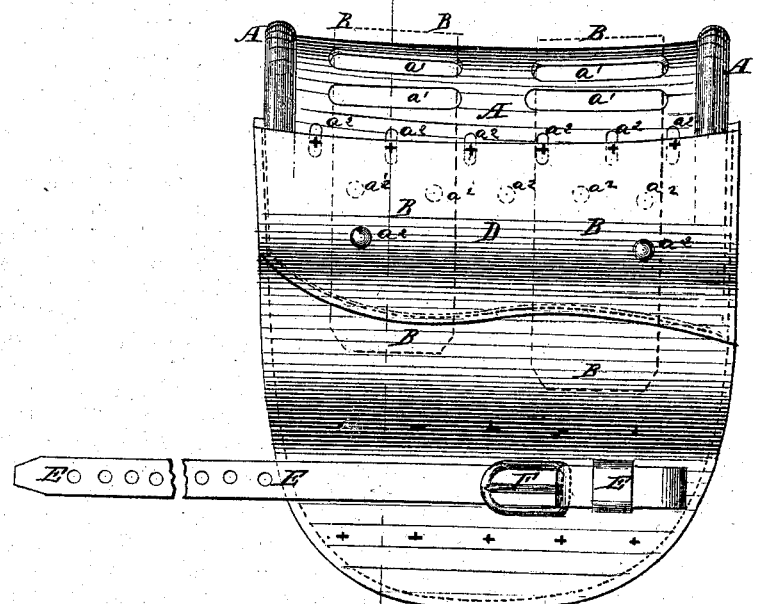
Figure 2:
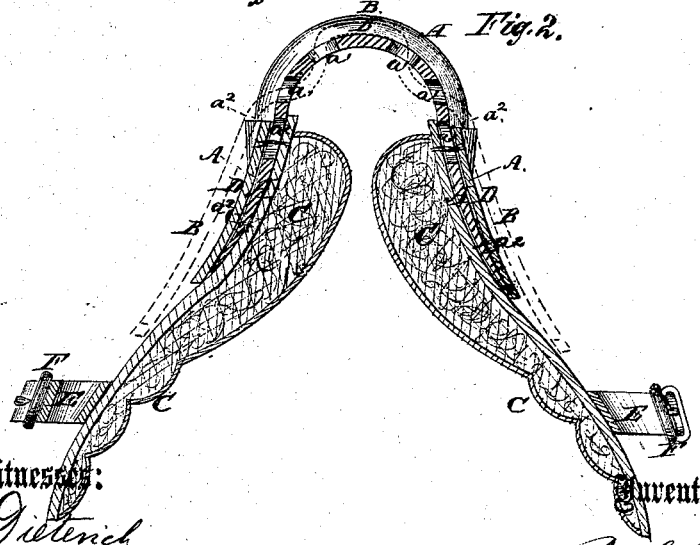

Be it known that I, PETER H. BEAVER, of Montandon, in the county of Northumberland and State of Pennsylvania, have invented a new and useful Improvement in Collar-Pad Tree, of which the following is a specification:

Figure 1 is a side view of my improved collar-pad tree, showing the collar-pad attached. Fig. 2 is a detail sectional view of the same taken through the line $x\ x$, Fig. 1.

Similar letters of reference indicate corresponding parts.

My invention has for its object to furnish an improved collar-pad tree, which shall be so constructed as to take off all friction from the crown of the horse's neck by the hame-straps, and to allow the air to circulate along the crown of the horses's neck, and which will hold the collar-straps securely in place; and it consists in the collar-pad tree, constructed as hereinafter more fully described.

A represents the pad-tree, which is cast of some suitable metal in about the form shown in Figs. 1 and 2. The middle part of the tree projects upward so as to stand above the crown of the horse's neck and thus form a clear space through which the air may circulate. In the upwardly-projecting rounded part of the tree A is formed a series of holes, $a$, for each collar-strap, each series of holes consisting of two holes, $a^1$, upon each side of said upwardly-projecting part or crown of said tree. The collar-straps B are passed in through the lower hole or slot upon one side, out through the upper hole of slot, over the crown of the tree, and in through the upper, and out through the lower, hole or slot upon the outer side, and are buckled to the other end of the collar. The straps B are thus held firmly in place, and are supported free from the horse's neck. The lower or side parts or plates of the tree A are made thin, and somewhat flaring, and have slots or holes $a^2$ formed through them to receive the stitches or rivets by which the pad C and cover D are secured to said tree A. To the lower part of the pads C D are attached open straps E, provided with a buckle, F, to be passed and buckled around the end parts of the collar to keep the said pads and collar in their proper relative positions. The buckled straps E F are designed to take the place of the leather loops usually employed for this purpose.

Having thus described my invention, what I claim, and desire to secure by Letters Patent, is—

1. The combination of the pad-tree A with the pads C, shaped or constructed as described, whereby a clear space is left above the crown of the animal's neck to which the pad may be applied, as set forth.

2. The combination of the open straps E and buckles F with the pads C D and tree A, substantially as herein shown and described, and for the purpose set forth.

P. H. BEAVER.

Witnesses:
O. H. P. SHIVELY,
WILLIAM FORNUALT.